(12) United States Patent
Houyou et al.

(10) Patent No.: US 11,334,054 B2
(45) Date of Patent: May 17, 2022

(54) DEVICE FOR USE IN PRODUCTION AND METHOD FOR ESTABLISHING A PRODUCTION INTERACTION

(71) Applicant: SIEMENS AKTIENGESELLSCHAFT, Munich (DE)

(72) Inventors: Amine Mohamed Houyou, Munich (DE); Hans-Peter Huth, Munich (DE); Gisbert Lawitzky, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1049 days.

(21) Appl. No.: 15/550,774

(22) PCT Filed: Feb. 12, 2015

(86) PCT No.: PCT/EP2015/052986
§ 371 (c)(1),
(2) Date: Aug. 12, 2017

(87) PCT Pub. No.: WO2016/128057
PCT Pub. Date: Aug. 18, 2016

(65) Prior Publication Data
US 2018/0039257 A1 Feb. 8, 2018

(51) Int. Cl.
*G05B 19/418* (2006.01)

(52) U.S. Cl.
CPC ... *G05B 19/4185* (2013.01); *G05B 19/41855* (2013.01); *G05B 2219/31115* (2013.01); *G05B 2219/31376* (2013.01); *Y02P 90/02* (2015.11)

(58) Field of Classification Search
None
See application file for complete search history.

(56) References Cited

U.S. PATENT DOCUMENTS

2004/0204772 A1   10/2004   Maturana

FOREIGN PATENT DOCUMENTS

| CN | 201017234 Y | 2/2008 |
|---|---|---|
| EP | 1580631 B1 | 3/2010 |

OTHER PUBLICATIONS

Xia et al., "Network QoS Management in Cyber-Physical Systems", 2008, IEEE, pp. 302-307. (Year: 2008).*

(Continued)

*Primary Examiner* — Qing Yuan Wu
(74) *Attorney, Agent, or Firm* — Lempia Summerfield Katz LLC

(57) ABSTRACT

The invention relates to a device for use in production, which offers at least one production service or is connectable to a device offering a production service comprising a physical interface across which data in relation to at least one physical property are exchanged with at least one other device; further comprising a cyber physical interface across which data in relation to production service properties are exchanged with at least one other device; and comprising a communication interface across which at least one communication link having defined communication properties can be established. The invention further relates to a corresponding method.

16 Claims, 4 Drawing Sheets

(56) References Cited

OTHER PUBLICATIONS

"The Authoritative Dictionary of IEEE Standards Terms", 2000, Standards Information Network IEEE Press, Seventh Edition, p. 844. (Year: 2000).*
European Office Action for European Application No. 15 705 564.1-1202 dated Jan. 29, 2020.
Kim, Kyoung-Dae, and P. R. Kumar. "Design and experimental verification of real-time mechanisms for middleware for networked control." Proceedings of the 2010 American Control Conference. IEEE, 2010. pp. 2119-2124.
Kim, Kyoung-Dae, and Panganamala R. Kumar. "Cyber-physical systems: A perspective at the centennial." Proceedings of the IEEE 100.Special Centennial Issue (2012): 1287-1308.
Chinese Office Action for Chinese Application No. 201580075960.7 dated Mar. 12, 2019.
Baillieul, John, and Panos J. Antsaklis. "Control and communication challenges in networked real-time systems." Proceedings of the IEEE 95.1 (2007): 9-28.
Küster, Tobias, et al. "Distributed evolutionary optimisation for electricity price responsive manufacturing using multi-agent system technology." International Journal On Advances in Intelligent Systems 7.1&2 (2013): 27-40.
Leitão, Paulo. "Agent-based distributed manufacturing control: A state-of-the-art survey." Engineering Applications of Artificial Intelligence 22.7 (2009): 979-991.
Monostori, László. "Cyber-physical production systems: Roots, expectations and R&D challenges." Procedia CIRP 17 (2014): 9-13.
PCT International Search Report and Written Opinion of the International Searching Authority dated Jan. 11, 2016, for corresponding PCT/EP2015/052986.

* cited by examiner

DEVICE FOR USE IN PRODUCTION AND METHOD FOR ESTABLISHING A PRODUCTION INTERACTION

The present patent document is a §371 nationalization of PCT Application Serial Number PCT/EP2015/052986, filed Feb. 12, 2015, designating the United States, which is hereby incorporated by reference.

FIELD

The present embodiments relate to a device for use in production, a network controller, and a method for establishing a production interaction

BACKGROUND

Production networks include several production devices or modules (e.g., a conveyer belt or milling machine) that offer production services (e.g., transporting or milling). Once a production network is set up, it is labor intensive to change the production network. Therefore, in the context of industrial automation, cyber physical production systems (CPPS) have been introduced, which include cyber physical production modules (CPPM) that offer an interface to a communication network.

However, the communication between the production network and the communication network is to be coordinated.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a possibility to facilitate cyber physical production (e.g., the set up of a production line) and a possibility to coordinate a communication such that a production network may be adapted flexibly are provided.

One or more of the present embodiments relate to a device that may be used in production.

The device offers at least one production service (e.g., transporting because the device is a conveyer belt). Alternatively, the device is connectable to a device offering a production service (e.g., as a module that may be added to existing production devices for providing necessary interfaces). This option allows "upgrading" of existing devices, thus costs may be saved.

Through a first or "physical" interface, data in relation to at least one physical property is exchanged with at least one other production device.

Through a second or "cyber physical" interface, data in relation to at least one production service property is exchanged with at least one other production device; through a third or "communication" interface, a communication link may be established.

This has the advantage that a communication with a necessary Quality of Service (QoS) may be provided, for example, by providing, via the physical interface, the type of production device and, by the cyber physical interface, the information that for use of the production device communication with a prescribed maximum delay and with a prescribed maximum error rate.

According to an embodiment, at least two of the interfaces are combined. This may facilitate an integration of a new production device.

One or more of the present embodiments further relate to a corresponding method, where a production interaction between a first production device and a second production device is established by establishing a physical link for exchange of at least one physical property of a production device between a first production device and a second production device. The method also includes establishing a cyber physical link for exchange of at least one production service property between the first production device and the second production device. The method includes deriving at least one communication property from one or more production service properties and requesting a communication link between the first production device and the second production device with the derived at least one communication property.

One or more of the present embodiments facilitate the operation of a cyber-physical production system. A plug and automate behavior may be supported.

The extraction of the network requirements for a complex production system may be done automatically (e.g., based only on local knowledge of communication needs by each production device or CPPM and the way the production devices of the CPPMs interact with one another).

DETAILED DESCRIPTION

Figure 1:
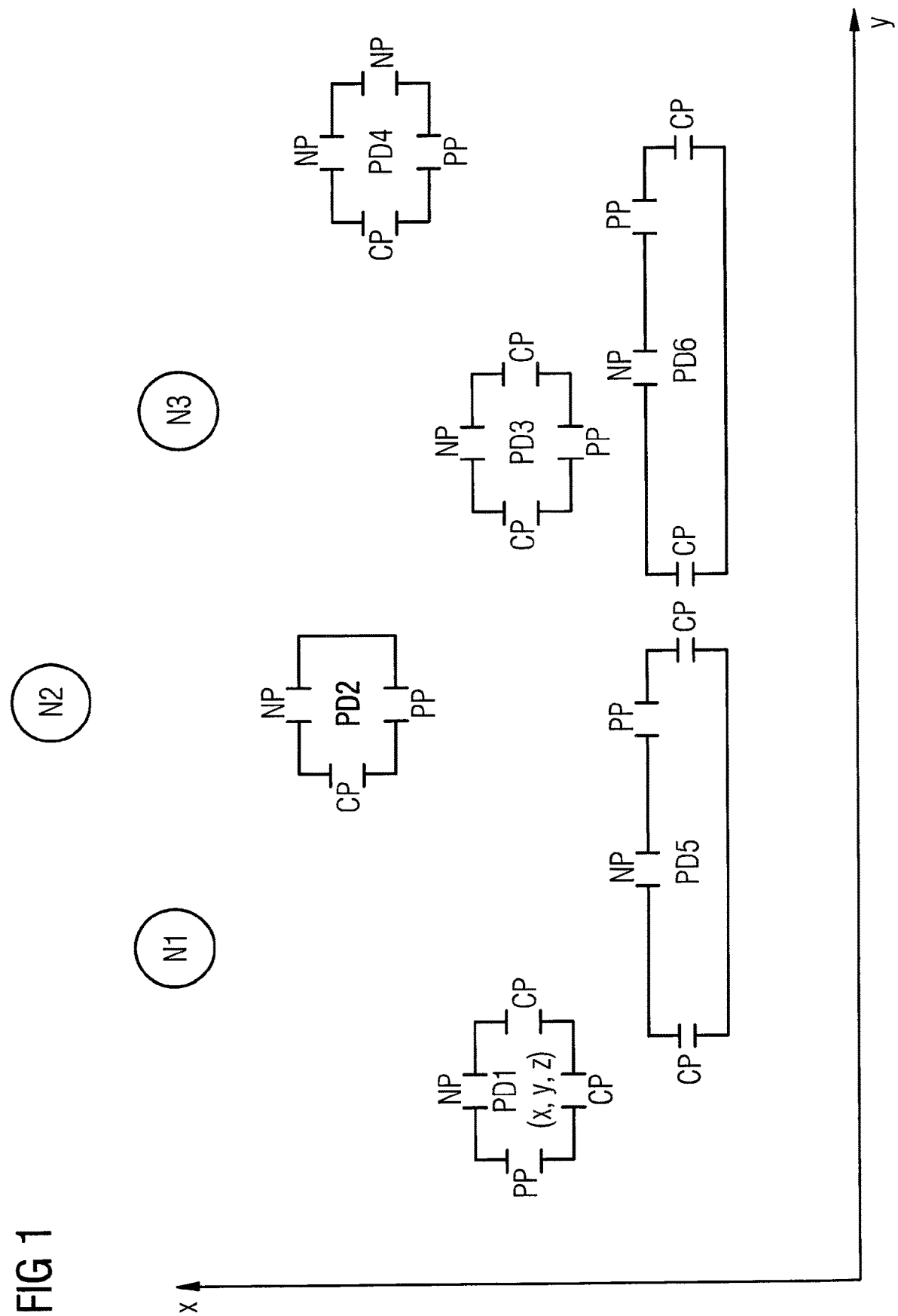
FIG. 1 shows an exemplary production network with cyber-physical ports and links or a cyber physical production system.

In FIG. 1, production devices PD1, PD2, PD3, PD4, PD5, PD6 are depicted. Any production device is located in a defined area (e.g., a production hall) where a production or part thereof takes place, which is indicated for the first production device PD1 by the set of coordinates (x,y,z).

In a first act, a first connection between two production devices is established by using a physical interface PP. By this connection or link, physical properties of a further production device are determined (e.g., the local position of a production device).

The actual or physical layout of a cyber physical production system CPPS is known. The exact positions of each production device or cyber physical production module CPPM is determined through a coordinate system.

The first production device PD1 is constituted by a gripping robot that puts the work piece from the conveyer belt constituted by the fifth production device PD5 to a milling machine constituted by the second production device PD2. The local position of the gripping robot is then described by a well defined point of the robot (e.g., the gripping device in a 3 dimensional orthogonal system).

Alternatively, the local position of the gripping robot may be described by polar coordinates. In cases where there are only 2 or 1 dimensions necessary (e.g., a conveyor belt transporting a work piece along a line at all at the same height), the position may be described by two or one dimensional coordinates. In cases where there is only the distance to a neighbored production device, the local position may be described by the distance between the production devices.

A neighborhood relationship, which may later be determined with regard to an envisaged service, between any two production devices or cyber physical production modules CPPM exists only if the two are physically close to each other, and a production function may overtake a work piece from a neighbor (i.e., a "physical production interface" exists). This allows an actual or physical interaction. The other interfaces described, physical interface, cyber physical interface, and communication interface, all relate to data exchange.

Alternatively or in addition, as another physical property, it may be determined whether the production is supplied with energy or/and operating supplies, or/and whether the production device is calibrated. Which physical properties of each other production device are to be known (e.g., are required) to a production device depends (e.g., on the kind of production, type of production device, etc.).

Via the physical interface, a wirebound or/and wireless connection may be established.

If the required physical properties of the other production device are known to the link initiating production device, then the cyber physical properties are determined (e.g., which production service or production services may be offered by the production device) across a cyber physical interface CP. This association between the production devices or CPPMs may be done by connecting the respective cyber physical ports.

Alternatively or additionally, one or more production service properties are derivable alone from the physical properties or in combination with the information provided via the cyber physical interface.

According to one embodiment, the connecting of the cyber physical ports takes place only during the establishment of the physical link or plug procedure.

Alternatively or additionally, the association takes place also at later stages.

As a cyber physical property or production service property, a capability of a production device is determined (e.g., that the first production device PD1 forms a gripping robot that may transport work pieces with predefined dimensions or within a range of possible dimensions or/and weight, within a certain range, and the fifth production device PD5 forms a conveyer belt that may transport a work piece at a certain speed from a starting position to an end position).

A further production service property that may be alternatively or additionally determined is information regarding the required actual or physical interaction (e.g., between the first production module PD1 and the fifth production device PD5, that the gripping robot puts a work piece on a defined position or area or range on the conveyer belt).

Another service property to be determined is which communication with which devices is to be provided for the intended production aspect.

Figure 4:
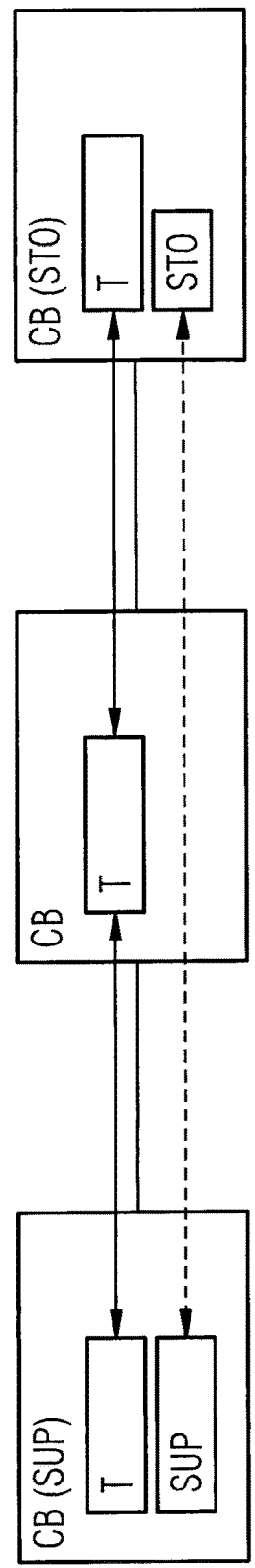
FIG. 4 shows a view of the services offered in the production network.

For example, with regard to transportation T, communication to the neighbored conveyer belt is to be provided (see also FIG. 4). For Supply SUP/Storage STO functions a communication between the point of entry (e.g., the first conveyer belt and the exit point; the last conveyer belt is needed).

Such communication properties include a maximum allowed delay, jitter, required bandwidth, importance, and therewith associated priority, or the reliability of a connection.

According to one embodiment, the route of the communication may also be fixed (e.g., over which network nodes data such as via a first network node N1 and a third network node N3 or via first network node N1 and a second network node N2) are exchanged.

The communication properties may be different for different type of services or/and different levels of workload.

In addition to one or more production service (e.g., transportation or milling), a production device may offer non-production services, such as IT orientated services (e.g., for the order of production materials or consumables or a centralized maintenance of the production system).

When the required communication properties for a production device are determined, then a production device sends a communication service request to the communication network (e.g., to a network controller via a communication interface NP or network port). Which production device sends the communication service request may be predefined or is negotiated between the production devices. Alternatively, both the production devices may send the communication request. When both of the production devices send the communication request, in the case of discrepancies between the requests, the controller decides how the requests are given priority based, for example, on ranking lists in the devices and/or situation dependent or whether the discrepancies have to be clarified with the devices.

According to another embodiment, the functionality of communicating across the physical interface PP, cyber physical interface CP, and communication interface NP may be in a separate module or device that may be connected or attached to a production device. Thus, an upgrading of already existing production devices is possible, which may save costs.

Figure 2:
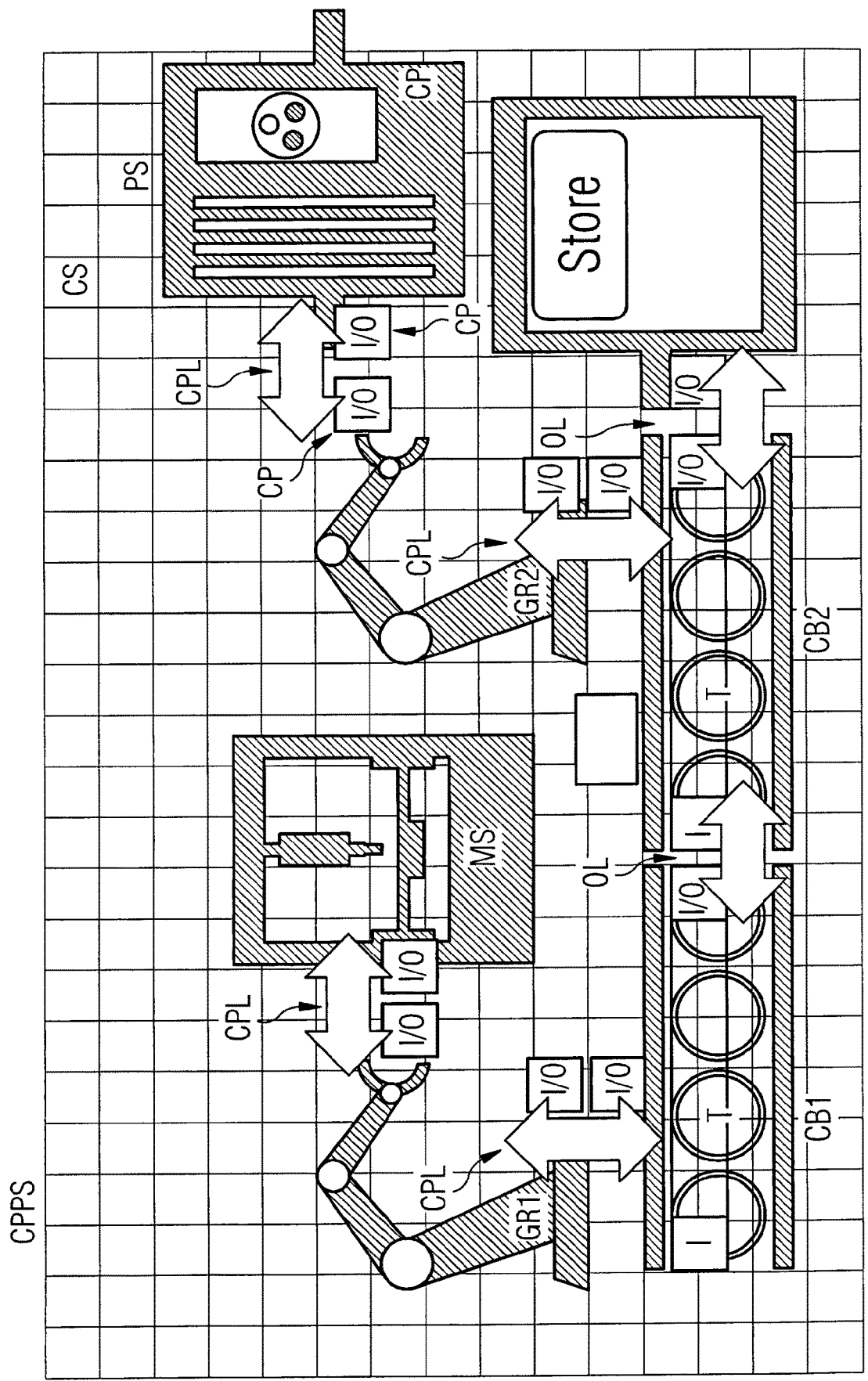
FIG. 2 shows an exemplary cyber physical production system (CPPS) in a coordinate system.

In FIG. 2, a cyber physical production system CPPS is defined as a graph of production units or production devices positioned in a coordinate system CS. The nodes of the graph are the production devices or CPPMs. The cyber physical links CPL represent the association between two CPPMs with cyber physical ports CP having connected to one another (e.g., the ports serve as interface). This association occurs in this embodiment only during the plug procedure of the CPPM.

Each CPPM offers at least a production service, with dependencies on external services that are defined in a list of pre- and post conditions. These conditions include the way the CPPM may collaborate with a direct neighbor at a given cyber physical port.

The pre-conditions of a plug operation (e.g., the prerequisites that a physical link is established) include, for example, the physical vicinity between the two CPPMs. The respective cyber physical port CP defines the input or output (e.g., actual, physical production interfaces where a work piece may be handed over to or by a neighboring CPPM; by a gripping robot GR to a first conveyer belt CB1). Out of this act, a production network is set up, which indicates that a work piece may correctly be handed over from one CPPM to the next.

A post condition may include whether the services are assigned correctly, such that production may start.

A CPPM is plugged together (e.g., the CPPMs are positioned together so that the CPPMs may pass workpieces physically amongst each other), which is referred to as actual "physical production interface." The CPPMs are also actually or physically plugged to a common network where the CPPMs may communicate via the physical interface PP in a limited manner and exchange initial information, which includes physical properties of the CPPMs (e.g., the physical port and the ID of the CPPM with which the CPPMs may exchange work-pieces). The direct neighboring CPPMs that are aware of each other's existence and the possibility to pass work pieces may have a cyber-physical link CPL between them, where information with offered production services for the respective CPPM is exchanged. These services are interconnected to neighboring CPPMs along a production line. There are two ways to associate two production services together: 1) A concatenation of production services may be built along a route (e.g., there exists a valid cyber-production link between each CPPM associated within this route); and 2) two production services that are not direct neighbors along the production network may be composed together only if there is a route along the production network connecting both CPPMs. This also provides that the CPPMs along the route may offer a simple transportation service in between.

According to a further embodiment, non-production services are hosted by one or more CPPMs. The non-production services also connect to each other without requiring a production network route or uninterrupted end-to-end path. This kind of service mesh up is described as a service overlay. An overlay network is a logical network connecting logical end-points that are hosted on physical nodes. The overlay link only indicates which logical nodes are known by a given overlay node and that the identifier or IDs of their hosts are known. The IDs of the devices in between (e.g., the physical network) are not known by the overlay end-point. An example of an overlay network is the global network connecting the dynamic name server (DNS) server infrastructure. Each DNS knows at least another root DNS server (e.g., if the local DNS server does not know the IP address of a given URL, the local DNS server forwards the request further to a root server that may know the IP address). The DNS server application in this case is the logical end-point, whereas the logical connection to corresponding known DNS servers is the overlay link. The end-point only knows the network ID of corresponding hosts and network IDs of corresponding peering end-points. The end-point does not care of the intermediate physical nodes in between. The global DNS network connecting all DNS servers to a root server includes an overlay network on top of the worldwide Internet network. In the case of automation systems, the production system includes physically ordered CPPMs connected together along a production line. A physical communication network or substrate is in between these physical devices. However, the logical end-points are the offered services that connect to each other along the production network. Therefore, production services are forming several overlay networks parallel to each other along the logical structure of the cyber physical links CPL between CPPMs. The overlay exists on top of a physical communication network of routers and switches connecting the physical CPPMs and is independent of the topology of the physical network.

In FIG. 2, a manufacture execution system (MES) service is drawn as overlay service using overly links OL between CPPMs, which does not require a production path to be found, as set out above. A MES is formed by the exchange of information between the first conveyer belt CB1 for supply and the second supplier belt CB2 leading to the storage. This logical connection does not require a cyber physical path along the production line, which would in this case also include further CPPMs (e.g., a first gripping robot GR1, a milling station MS, a second gripping robot GR2 and a painting station PS to be known).

Thus, the only required connectivity is via a communication network, where a networking path is to exist between the hosting CPPMs of the composed service instances.

Alternatively or additionally, MES services may be installed between other individual CPPMs or other equipment such as servers or applications or storage facilities in a cloud.

Figure 3:
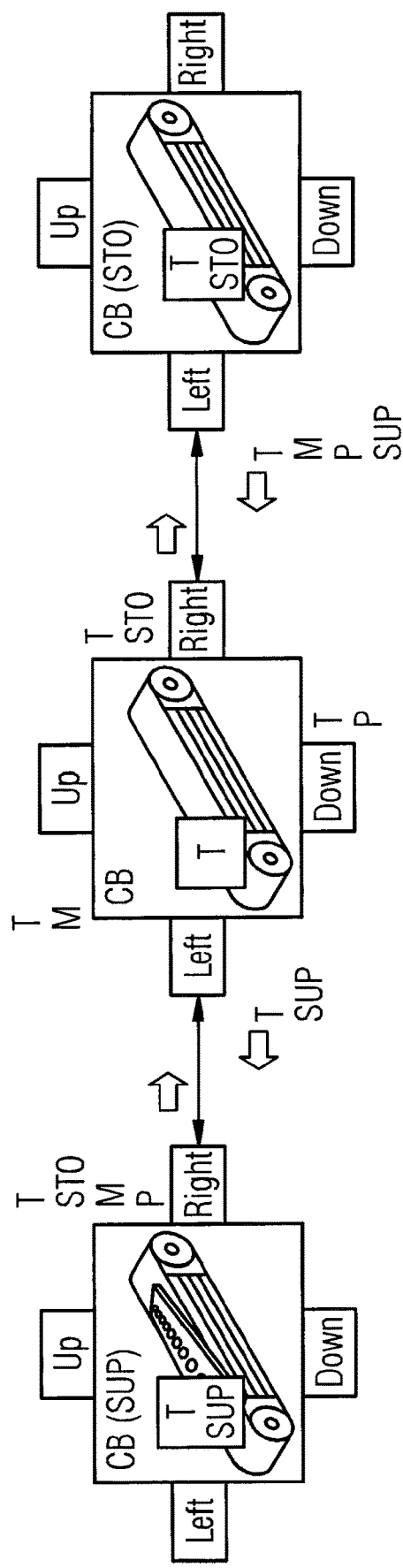
FIG. 3 shows a view of a production network.

In FIG. 3, the production service "transportation" T is composed of transportation specialized modules, therein one conveyer belt CB for Supply SUP and one conveyer belt CB leading to storage STO. The layout thereof is defined as a concatenation of several CPPMs, each offering a transportation service.

When two direct neighbors along the production networks have completed physically associating their cyber physical ports or being associated via the cyber physical interface CP, this provides that the two are able to exchange work pieces physically. The first pre-condition of the plug phase is now satisfied. There is now a first link and hop along the production system.

Each module offers a transportation T service from one input port along a given trajectory to an exit port, given that there is a CPPM at the exit port that may handle the transported type of work pieces. The internal rules for a CPPM to collaborate with direct neighbors are part of the service description offered by each CPPM individually. By hard coding (e.g., by storing in a non erasable memory), the negotiation may be simplified and hence realized faster.

Further, services such as storing STO, milling M, or print P are offered. The existence of a service is made dependent on the direction, thus reflecting the physical topology of the production network (e.g., whether there is a storage in the left direction from the CPPM or to the right). Alternatively or additionally, a direction may be described by 3 dimensional coordinates, depending on how the physical production network is set up. In FIG. 3, for the conveyer belt CB for supply SUP, the milling, for example, is available only in the direction to the right side or at the cyber physical ports opened in that direction.

The cyber connectivity between the two production services may be established after the physical connectivity is completed.

For this to happen, a data exchange network is to exist between the two hosting CPPMs for the two hosting CPPMs to negotiate cyber ports via the cyber physical interface CP. This provides that the two neighboring services may define the data exchange that is to occur between the two neighboring services, based on corresponding service descriptions.

In the example of the transportation T service composition of FIG. 3, the services elect a master drive or conveyer belt CB that acts as a master, which publishes a speed and rotation pattern to other service instances or CPPMs.

The transport T service interaction uses a low delay communication with a guaranteed low jitter defined for the correct functioning of the combined service (e.g., the transportation from the entry point to the exit point; the supply SUP to Storage STO).

As part of the service description, the expected network capacity at the local communication interface NP is described for each service interaction separately. The data transfer may be dimensioned as a bit-pipe (e.g., for the connection between the service endpoints, a maximum bandwidth limit is allocated).

For example, the service transportation may include two data interactions (e.g., (1) to coordinate work piece handling, which requires a 500 Kbps connection to each direct neighboring CPPM, and (2) to coordinate speed interaction, which requires an additional 200 Kpbs times the number of coordinated CPPM from the coordinating master service). In addition, the network path is to deliver the data with a delay limit of 10 msec and a maximum jitter of 2 msec.

Other nonfunctional (e.g., not related to the correct functioning of the offered service) offered requirements may be associated with the expected QoS requirements, such as reliability level or importance level of the application service. The list of possible communication attributes are listed in the table below.

Once the service mesh up is done, all CPPMs where a service instances are hosted are known, and the interactions and associations for data exchange between any two service end-points are also defined. The resulting demand for resources or required communication service may be described as an overlay network connecting the service instances, where the required network capacity of each overlay link is known. The link exists between the two services directly if these two services are to exchange data with each other. The capacity of the link adds up all the requirements from all the interactions between those two service instances. This is referred to as a communication service request, which defines overlay links each dimensioned according to the combination of all interactions occurring on this logical link. For production services, the layout of the production network, and the interaction description as mentioned above lead to a sum of requirements on each overlay link.

The communication overlay with its links, member CPPMs, and link capacities are considered a communication service request. By this communication service request, the necessary communication resources may be requested from the network.

The request may be sent to a network configurator (e.g., a controller which) that may access the network elements and define the forwarding entries per networking element and per link to provide the connectivity requirements and QoS capacity of each overlay link. The communication network has the mechanisms to search for appropriate routes and reserve the necessary bandwidth in order to meet the communication service requirements listed in the table below.

In FIG. 4, a service composition view of the production network depicted in FIG. 3 is shown. A production link exists between the respective conveyer belts as production devices and is depicted with a continuous line. The respective communication service requests for the supply SUP to storage STO MES Service, which is depicted by a dashed line, is characterized by an overlay topology assigning a medium importance for that service.

In contrast, for the transportation service, which is depicted by a continuous line, the communication service request is designed by an overlay topology requiring a low delay communication of high importance, and high reliability, which is only required as long as the production path exists.

Figure 5:
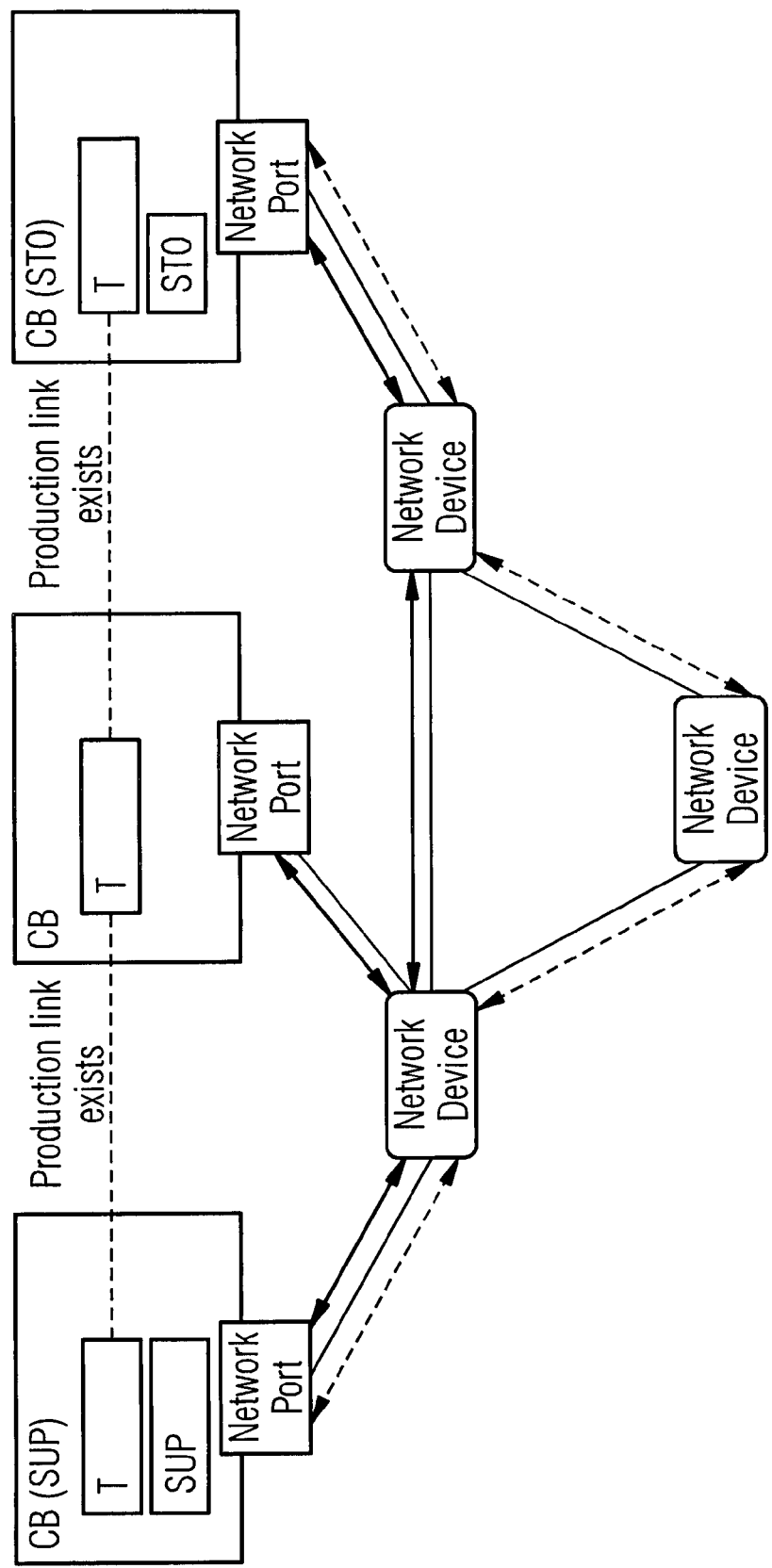
FIG. 5 shows a view of the communication network for exchanging data in relation to the services offered in the production network.

In FIG. 5, a view of the communication network used for the production network is depicted. The links corresponding to the different services of FIG. 4 take, in this example, different routes (e.g., across different network nodes), depending on the requirements of the data exchange for a service.

The communication service may be specified by a name and an ID that may be extrapolated from the production service names connected in a single overlay (e.g., the overlay connecting service_Transportation@CPPM1, service_ Transportation@CPPM3, service_Transportation@ CPPM4 may be referred to as service_transport).

The creation of the communication service may be requested by any of the service instances. According to an embodiment, the creation of the communication service is requested by the coordinating master service. Each CPPM that is added to the production network may join this production service, given that the production network connectivity is correctly established.

The new CPPM may then connect to the logical network. The "join service_transport" command may be sent after the establishment that there is a route between to the new CPPM along the production network.

The "leave service_transport" is sent once either the service is detached by the user, on purpose, (e.g., software update, reprogramming, etc.) or because the CPPM is physically disconnected or the production route has been broken. If the CPPM is totally isolated from the rest of the production system, "remove from all service overlays" command may be sent.

According to the described example, the network connectivity always exists between the CPPMs and the configurator of the communication services in order to send such commands. If the network configurator cannot reach the CPPM, the production network is updated that the CPPM is not reachable, and a "suspend CPPM from service_transport" is sent to the remaining CPPMs informing the remaining CPPMs that the production network has changed. The still active CPPMs suspend communication to the missing CPPM, as well as adapt the corresponding production network view.

The dependency between the network and the production network introduced in the present embodiments also affects all the phases of creation, updating and changing the communication service. The "create communication service" command may be sent by the first initiating CPPM as soon as a first production service mesh up between at least two CPPMs is established. This command precedes the "join" command sent by other CPPMs connected afterwards. The established communication service within the physical network is only correct if the production path between the services exists is maintained.

Non-production related services such as MES processes might create a service mesh up without a direct path along the production network.

Therefore, the above dependency on the production network is not required here. The network configurator only uses both CPPMs to be connected physically to the communication network for the "create," "join," or "leave" communication service commands to be executed.

The table below defines as an exemplary embodiment in which communication service requirements may be part of the communication service request and the way to describe this requirement in terms of parameters.

| Communication Service Request Attribute | Communication Service Parameter Set per Attribute |
|---|---|
| Simplified traffic matrix which details the service overlay nodes and links and the networking constraints for each overlay link | Overlay network with links between end-nodes, while specifying each overlay link characteristics. |
| Minimum Bandwidth demand (minBW) | Bidirectional minimum required bandwidth (minBW) of Overlay Network Graph is obtained from given service heuristics:<br>1) Cyclic controllers could define code words per cycle time. Requirement per controller depends on number of periphery devices.<br>2) Default estimates (e.g., 200K bps per TCP (transmission control protocol) or UDP (user datagram protocol) flow), publish-subscribe relation between any two service instances<br>3) If the delay requirement is known, this may be used as to deduce minimum required bandwidth, which may be compared with estimates from (1) and (2) (minBW >> MTU/max_delay, where maximum transfer unit (MTU) size is 1500Bytes for Ethernet)<br>4) In case reliability, No-Loss (see below); add a bandwidth margin to avoid congestion or loss through buffer overflow. |
| Reliability Levels (No-Loss, High, Non-specified) | No Loss: near zero packet loss in case of failure scenarios:<br>failed link/node<br>bit error/channel error<br>congestion/buffer overflow.<br>High reliability: little packet loss tolerated at link or network layer for above scenarios. Requires some L2/L3 resilience measures like routing table entries defining two physically disjoint paths for each overlay link).<br>Non-Specified: does not expect any additional measures to ensure resilience against loss besides relying on the network's ability to self-heal. |
| Importance (Very high, high, non-specified) | Very high is safety critical or production critical.<br>High are control systems that do not affect safety, do not affect the production either due to redundancy, modularity, etc. Monitoring services having data that is fed in the production system to control system load, for example.<br>Non specified: unless defined through a system-wide policy, any other application (MES, ERP, Video, Software updates, etc.) may be serviced last, or if network overloaded, may be postponed, or access the network iteratively. |
| maxDelay | Search for paths network paths that fulfil dtrans $$\leq \sum_{i=1}^{n} (dqueue(k) + maxBurst\_size/minBW(k))$$ whereby dqueue(k) proportional to congestion level |
| maxJitter | Max(delay_variation before deadline is not met, could be deduced from cycle time, event deadlines, etc.) |

Thus, it is one advantage of the present embodiments that there is the provision of connectivity between cyber-physical production modules (CPPMs) with the correct network QoS and without explicit configuration.

It is also possible to use a communication ontology to describe where the QoS requirements may come from (e.g., Bandwidth, delay, reliability may be hard-coded in the service description of each service instance). The negotiation of the actual values to be employed between services during the plug phase for the network parameters depend on dynamic numbers of service instances in a production overlay (or service mesh up) and the layout of the overlay links connecting the service instances.

The CPPMs may be able to discover each other's services that may be associated with each other (e.g., there is a cyber physical link between associated CPPMs or an overlay path in between). This constraint is a pre-requisite to request communication service between associated CPPMs.

Also interrupting the production network has a direct implication on automatically updating a communication service. The present embodiments cover how to automatically generate the requested communication service from knowledge of the production network, as introduced here, and the local service descriptions.

The system wide policies may also be based on service attributes, such as defining a serving rule that all production-related services negotiated at the plug phase are classified as "highly important" and requiring a "high reliability" communication service. Non production related services receive the remaining network capacity and are treated as lower priority in case of congestion or contention for limited network resources.

Although the present invention has been described in accordance with exemplary embodiments, it is obvious for the person skilled in the art that modifications or combination between the embodiments, fully or in one or more aspects, are possible in all embodiments.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A device for use in production, the device providing at least one production service or being connectable to a device providing the production service, the device comprising:
   a physical port for establishing a physical data connection to another device, across which data in relation to at least one physical property are exchanged with at least one other device, wherein the other device provides at least one second production service or is connectable to the device providing the production service, wherein the other device has a physical production interface with the device, and wherein the physical data connection from the device to the other device is wireless or wirebound;
   a cyber physical port for establishing a cyber physical data connection to the other device, across which data in relation to at least one production service property are exchanged with the at least one other device; and
   a network port across which at least one communication data connection having defined communication properties is establishable via nodes of a communication network between the device and the at least one other device, the communication properties being derived from one or more of the at least one production service property such that communication over the communication network with a necessary quality of service is providable.

2. The device of claim 1, wherein at least two ports of the physical port, the cyber physical port, and the network port are combined in one interface.

3. The device of claim 1, further comprising a further production device configured to derive communication properties required for one or more production services from one or more production service properties, configured to derive one or more production service properties from one or more physical properties, or a combination thereof.

4. The device of claim 1, further comprising a further production device configured to derive a master production service, by which other production services are coordinated, from the master production service, a communication service request being transmittable to the communication network.

5. The device of claim 4, wherein in the communication service request, requirements for all communication stemming from the device are combined.

6. The device of claim 1, wherein the at least one physical property comprises local position, alignment, or the local position and the alignment of a production device, provision with electrical current, provision with operating supplies, determination that a production device is calibrated, distance to a second production device, or any combination thereof.

7. The device of claim 1, wherein the at least one production service property comprises a type of one or more possible production service, a direction in which a production service is available, a capability of a device, information regarding a physical interaction between the device and a device of the at least one other device, a neighborhood parameter that denotes that a distance from the device to the other device is small enough that an interaction with respect to a specific production service is possible, a requirement regarding the communication between the device and the other device, or any combination thereof.

8. The device of claim 1, wherein requirements regarding a communication service depend on a production service to be established with another device, the requirements regarding the communication service are quality of service, jitter, delay, bandwidth, reliability, or any combination thereof, or a combination thereof.

9. The device of claim 1, wherein the device hosts non production services.

10. The device of claim 9, wherein the non production services include manufacture execution services.

11. The device of claim 1, wherein one or more production service parameters of the at least one production service parameter are hard coded in the device.

12. The device of claim 1, further comprising:
a network controller for a communication network, the network controller being configured to:
receive communication service requests from and send commands to at least one device for use in production;
add and detach a device for use in production from a production network and inform at least one further device for use in production about changes in the production network, and
access network elements and define forwarding entries per network element and per overlay link to guarantee connectivity requirements and QoS capacity of each overlay link.

13. The device of claim 12, wherein the production service provided by the device requires communication between the device and the other device.

14. A method for establishing a production interaction between a first device for use in production and a second device for use in production, the method comprising:
establishing a physical data connection between the first device and the second device for exchange of data relating to at least one physical property of a device, wherein the second device provides at least one second production service or is connectable to the first device providing the production service, wherein the second device has a physical production interface with the first device, and wherein the physical data connection from the first device to the second device is wireless or wirebound;
establishing a cyber physical data connection for exchange of data relating to at least one production service property between the first device and the second device;
deriving at least one communication property from one or more production service properties of the at least one production service property;
requesting a communication data connection via nodes of a communication network between the first device and the second device with the derived at least one communication property such that communication over the communication network with a necessary quality of service is providable.

15. The method of claim 12, further comprising:
receiving, from the communication network, a grant or denial in regard to the communication data connection;
determining whether the cyber physical data connection is established correctly;
starting the production interaction; or
any combination thereof.

16. The method of claim 14, wherein the at least one communication property is determined from the cyber physical data connection, from a type of production service, or from a type of production device.

* * * * *